Z. N. MORREL.
Culinary Apparatus.
No. 24,752.
Patented July 12, 1859.
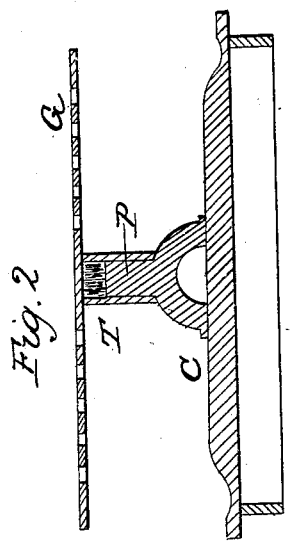
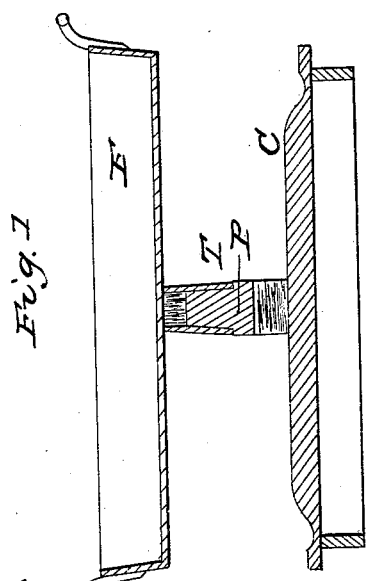
WITNESSES
Hugh M. Sutherland
W. N. Dorsey
INVENTOR
Z. N. Morrel

UNITED STATES PATENT OFFICE.

Z. N. MORREL, OF CAMERON, TEXAS.

PORTABLE OVEN.

Specification of Letters Patent No. 24,752, dated July 12, 1859.

*To all whom it may concern:*

Be it known that I, Z. N. MORREL, of Cameron, in the county of Milam and State of Texas, have invented a new and useful Improvement in Culinary Apparatus; and I do hereby declare that the following is a full, clear, and exact description of the same, reference being had to the annexed drawing, forming part of this specification, in the several figures of which similar characters of reference denote the same part.

Figure 1 is a sectional view of cover of Dutch oven or skillet with a frying pan over it. Fig. 2 is a sectional view of the same with gridiron attached.

This invention has reference to an improvement in the culinary utensil usually known as a Dutch oven and skillet, and its nature consists in forming a pin on the top of the handle of the cover of the oven, and having a tube in the center of the frying pan, or gridiron so that this tube will fit on the pin of the oven, and hold the pan or gridiron over the oven.

In the drawing C, represents the cover of Dutch oven or skillet P, the pin on its handle, F, the fry pan, G, the gridiron and T, their tubes in the center of them.

This improvement is particularly useful in camping out, when the Dutch oven or skillet is used for baking bread, by putting coals under it, and on top the cover, and by placing the frying pan or gridiron over the coals on the cover, by means of pin P, and tube T, it is held over the cover of the oven, and at the same time that the bread is baking in the oven, and by the same coals, the meat can be fried or broiled on the utensil above, thus economizing both time and fuel.

I claim—

Forming the pin on the handle on the cover of Dutch oven or skillet in combination with the tube under the center of the frying pan or gridiron, substantially as, and for the purposes herein set forth.

In testimony whereof I have hereunto signed my name before two subscribing witnesses.

Z. N. MORREL.

Witnesses:
GEO. PATTEN,
JOHNS HOLLINGSHEAD.